United States Patent

[11] 3,609,711

[72] Inventor John B. Gunn
Mount Kisco, N.Y.
[21] Appl. No. 889,202
[22] Filed Dec. 30, 1969
[45] Patented Sept. 28, 1971
[73] Assignee International Business Machines Corporation
Armonk, N.Y.

[54] MEMORY PLANES CONNECTED IN SERIES TO A POWER SUPPLY, WITH OPTO-ELECTRONIC ACCESS
11 Claims, 3 Drawing Figs.

[52] U.S. Cl. 340/173 R, 340/173 FF, 340/173 LT
[51] Int. Cl. G11c 5/06, G11c 7/00
[50] Field of Search 340/173 LS, 173 FF, 173 SP, 173 R; 307/238

[56] References Cited
UNITED STATES PATENTS

| | | | |
|---|---|---|---|
| 3,404,382 | 10/1968 | Rosenheck | 340/173 SP |
| 3,499,158 | 3/1970 | Lavine | 340/173 LT |
| 3,543,248 | 11/1970 | Oliver | 340/173 LT |

*Primary Examiner*—Bernard Konick
*Assistant Examiner*—Stuart Hecker
*Attorneys*—Hanifin and Jancin and John E. Dougherty, Jr.

ABSTRACT: The memory is formed of semiconductor current steering bistable circuits. These circuits are arranged in groups on circuit boards with each group including the storage circuits for 1 bit position in each word. The groups of circuits are connected in series across the computer voltage supply so that essentially the same current flows through each group of circuits. With this series arrangement, the voltage level is different for each group of circuits and read/write and control signals are coupled to and from the circuits with opto-electronic coupling means which transmit signals independently of voltage level.

INVENTOR
JOHN B. GUNN

BY John E. Dougherty Jr.
ATTORNEY

MEMORY PLANES CONNECTED IN SERIES TO A POWER SUPPLY, WITH OPTO-ELECTRONIC ACCESS

BACKGROUND OF THE INVENTION

FIELD OF THE INVENTION

This invention relates to computer organization and, more specifically, to the organization of the component elements of the computer relative to the power supply in the computer, and the manner of communicating between these units.

It is, of course, well known that computers, as well as other large electronic systems, include parallel, as well as, series-connected components; and, it is basic that the current and voltage supply requirements for any circuit depend upon whether a series or parallel arrangement is employed. However, the basic components in computer systems have been connected in parallel across the voltage supply, and have communicated with each other at the same voltage level. This type of organization has remained the same even though the ever increasing current requirements of larger computers have resulted in larger and larger current carrying conductors and attendant power supply problems.

SUMMARY OF THE INVENTION

In accordance with the principles of the present invention, a new and improved computer organization and, specifically, a computer memory organization, is provided in which the individual storage circuits are arranged in groups which are series connected. The voltage is then higher than in the normal computer but the current is less. As a result, power supply and distribution problems are alleviated. Since the circuits operate at different voltage levels in the different groups, coupling to and from the circuits is accomplished by opto-electronic devices which operate independently of voltage levels. For balanced current flow, current steering storage circuits are employed which carry essentially the same current in either storage condition. The same number of storage circuits are arranged in each group, with the group including 1 bit position for each word. Since memory operation is on a word basis, switching of storage circuits during reading or writing produces negligible current changes within any group, and fluctuations are easily accounted for by shunt regulators connected across each group of storage devices.

Therefore, it is an object of the present invention to provide an improved computer organization for the transmission of power.

Another object is to provide an improved computer organization, and specifically, a memory organization in which current requirements are limited and in which signals can be coupled to and from different memory units which are operated at different voltage levels.

These and other objects, features and advantages of the invention will be apparent from the following more particular description of a preferred embodiment of the invention, as illustrated in the accompanying drawings.

DESCRIPTION OF PREFERRED EMBODIMENT

Figures 1, 1A:
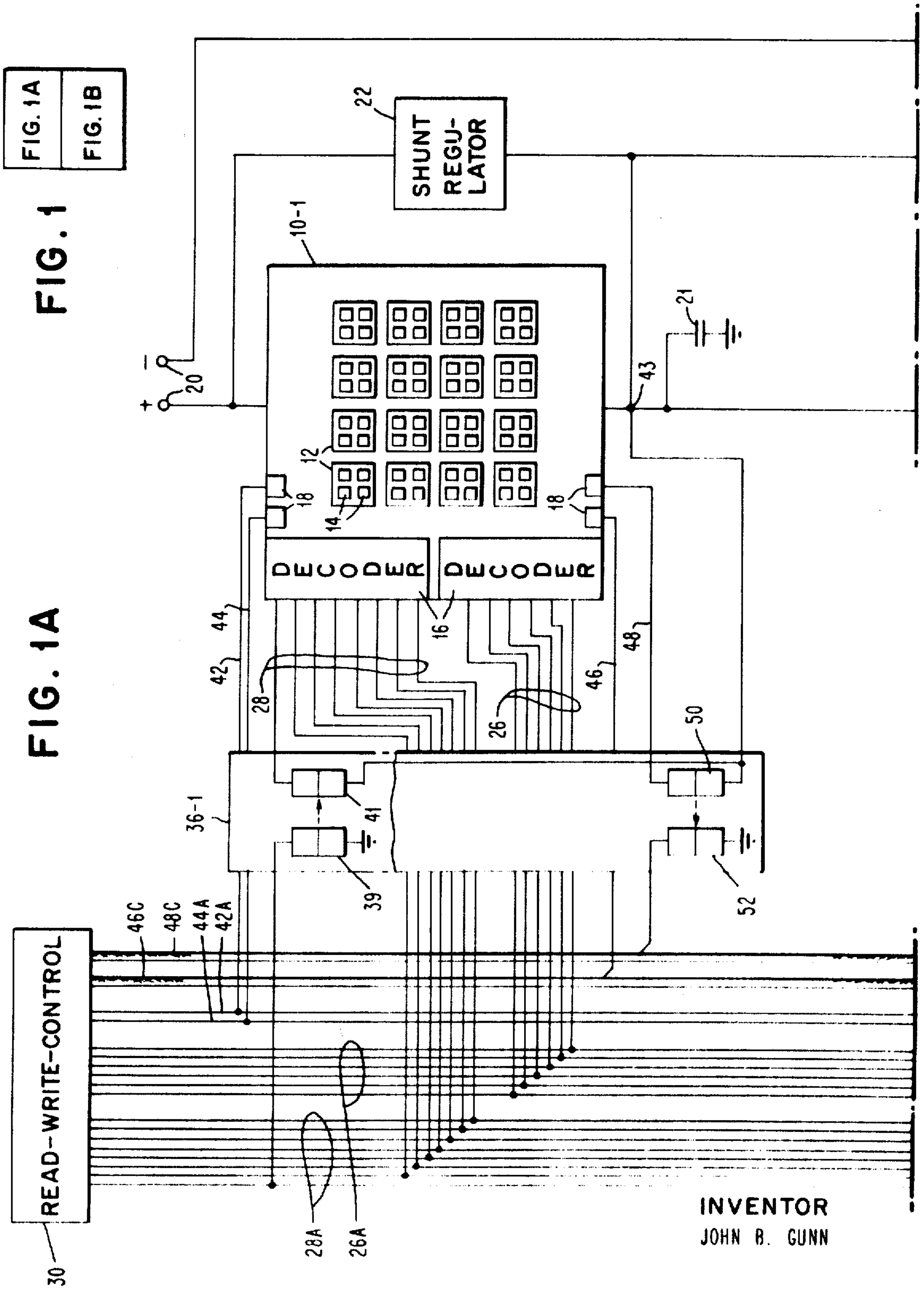
FIG. 1A and FIG. 1B taken together as shown in FIG. 1 are a schematic block diagram of a complete memory organized in accordance with the principles of the present invention.
Figure 1B:
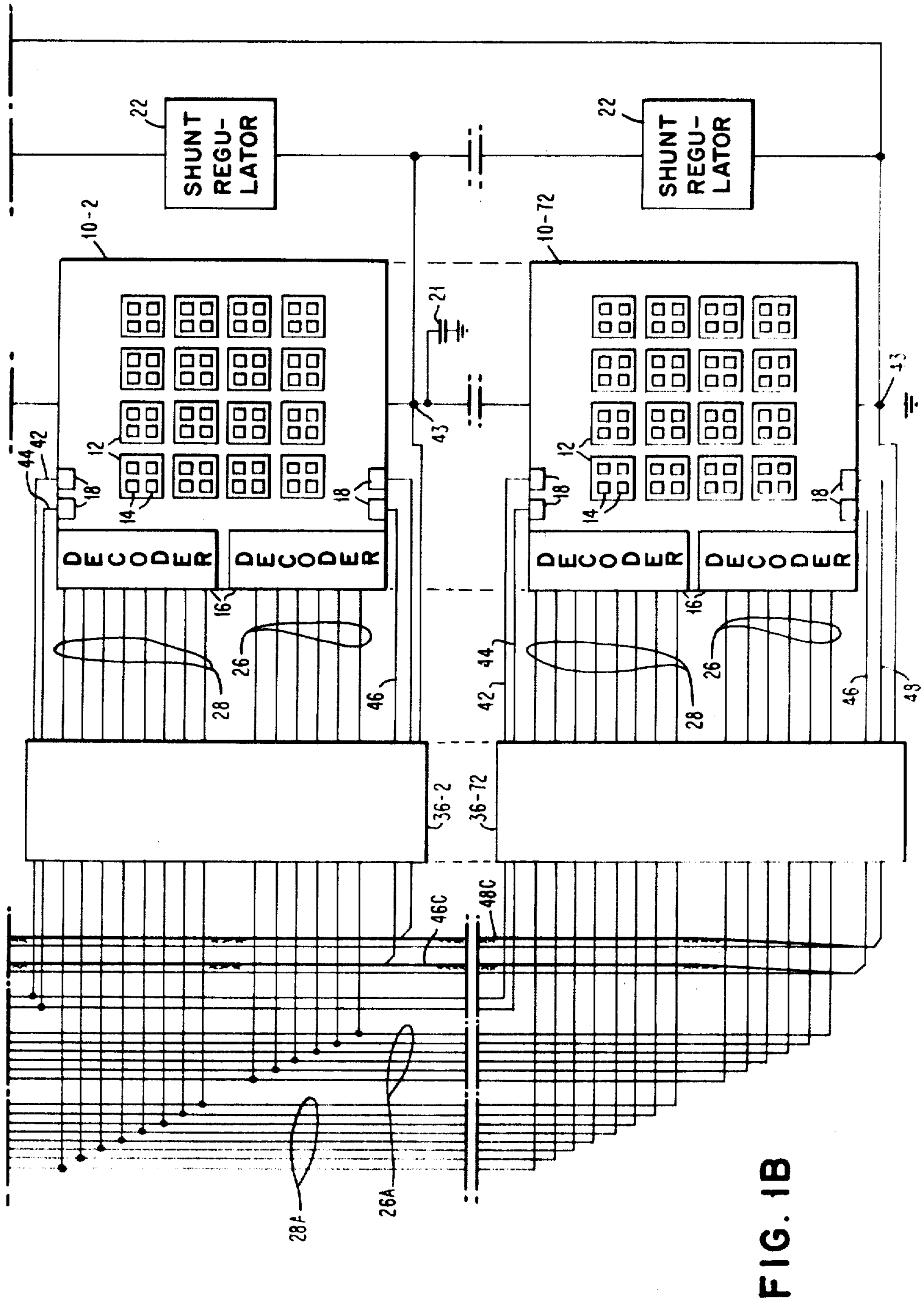

The memory as shown in FIGS. 1A and 1B is formed of a plurality of integrated circuit planes or boards, of which three are shown and are designated 10–1, 10–2, and 10–72. Each plane contains a group of storage circuits for one bit position in the memory. To be more specific, the illustrative embodiment of the invention is a memory having 8,192 words, each containing 72 binary storage positions. The memory shown, therefore, contains 72 of the integrated circuit planes 10, one for each of the 72 bit positions in the memory. Each of these planes includes 8.192 bistable storage circuits, one for each of the words of the memory. The arrangement is such that each plane contains the storage circuits for the same bit position of each of the 8.192 words. For example, plane 10–1 contains the storage circuits for the first bit position in each word, and plane 10–72 contains the storage circuits of the last or 72nd bit storage position in each word. The individual binary storage circuits use semiconductor devices as active elements. These circuits are mounted in modular form on each of the circuit boards 10. Each board contains 16 modules 12; each module contains 4 semiconductor chips 14; and each chip contains the semiconductor devices and components for 128 binary storage circuits.

There is also contained on each plane, decoder circuitry represented by block 16, which is employed in the addressing of the various bistable circuits on each circuit board or plane 10. There are further provided amplifiers designated 18, also shown in block form, which are employed in a manner later to be described in the reading and writing operations.

The circuit boards 10 are connected in series between the two terminals 20 for the power supply for the memory in the computer. With this type of a circuit arrangement, the current flows through each of the circuit boards and, though the voltage drop is the same across each board, the voltage level differs from board to board. There is provided in the circuit between the successive series connected boards a bypass capacitor 21 to ground which provides a means of shunting high frequency signals to ground and preventing them from being transmitted from circuit board to circuit board. There is also provided in parallel with each circuit board a shunt regulator designated 22, the function of which is to carry, under normal circumstances, an excess current over that which is required by the board. This excess current is diverted automatically to the board during certain switching operations when more current is required by the circuit being switched on the boards or when there is a change in the current being supplied.

The memory circuit shown in FIG. 1A demands for proper operation that the current flowing through each board is essentially the same. Therefore, the bistable storage circuits on each board must be capable of operating in such a way that substantially the same current is required under all conditions. To be more specific, each of the bistable storage circuits is of the well-known current steering type. In such circuits which are common in the art, the current is steered through one of two possible paths to store a binary 1 and to the other path to store a binary 0. Regardless of whether a binary 0 or a binary 1 is stored, the current carried by the circuit is substantially the same. Further, such circuits are commonly designed where the current requirements are essentially the same even when switching between binary states. Since the memory is word organized with 1 bit position on each board, only one circuit on a board is switched at a time. In some cases, however, an excess current is drawn during a switching operation but this current is easily accommodated with the use of a shunt regulator 22. Further, since switching takes place simultaneously on the addressed position of each plane, the excess current is the same for each plane and the shunt regulator requirements are minimized. For preferred practice of the invention, the current requirements of the groups of series connected circuits should not vary by more than 10 percent.

The series arrangement of the memory boards is only possible under such conditions, i.e. where essentially the same number of memory devices are located in each of the series connected groups and in which there are similar variations in the current requirements of the overall group during the memory operation. However, the communication between each of the memory boards 10 and the remainder of the circuits used in the computer presents problems which are peculiar to this type of circuit arrangement. Though each circuit board requires essentially the same voltage drop across the entire board, as well as across the individual circuits on the board, the voltage level differs from board to board. This being the case, it is necessary to provide signals to the memory boards to control reading and writing and also to receive output signals from the boards in such a way as to be independent of the voltage levels on the individual boards.

Each board, as is shown in FIGS. 1A and 1B, is provided with two groups of address lines 26 and 28 which are selectively energized during a read or write operation to select one word position in the memory. The signals applied to the lines 26 and 28 determine the particular storage position on each board which is to be operated upon during the particular operation. These lines 26 and 28 are connected to decoders 16 which in turn are connected with wiring (not shown) on the boards to select a particular one of the storage circuits on each board. The decoders may include amplifiers to amplify the input signals.

The source of control signals for addressing a particular word position in the memory is represented in the circuit of FIG. 1A by block 30 which is the read/write and control circuit. From this block extends two groups of lines 26A and 28A. These lines are coupled to the address lines 28 and 26 for each of the individual boards by opto-electronic coupling circuits represented by block 36. Each of the blocks 36 includes for the address lines 26 and 28, 14 opto-electronic coupling circuits each of which, as is indicated in block 36–1 of FIG. 1A, includes a semiconductor light emitting diode 39 and a semiconductor light responsive diode 41. The input signal when applied to the diode 39 produces a light output represented by dotted arrow which is transmitted to the junction of diode 41 to generate a voltage across this junction. This voltage is with reference to the voltage at terminal 43. This is the reference voltage for the associated board 10. Using this type of an arrangement, it is possible when the read/write control circuit 30 energizes the proper combination of address lines 26A and 28A to couple individual signals from these lines to each board even though the boards are operated at different voltage levels. This is accomplished using the opto-electronic coupling represented by diodes 39 and 41 wherein the output voltage of the receiving diode is isolated in terms of voltage level from that of the input diode.

There are four other input lines to each of the memory planes and these lines are designated 42, 44, 46, and 48. These lines are opto-electronically coupled to lines 42A and 44A, and lines represented by cables 46C and 48C which are connected to read/write control 30. The lines 42, 44, 46, 48 on each memory block are coupled to the amplifiers represented at blocks 18 and it is these lines which specifically control the transmission of information during a reading and writing operation. Thus, line 42 is energized when a writer operation is to be performed and lines 46 carry the individual information bits, which are to be written during a write operation. In some applications two input lines are required, one of which is energized for a binary 1 and the other for a binary 0 write input. Line 44 is energized for a read operation and lines 48 transmit to the output the individual information bits read off the planes. The signal on each line 48 representative of binary 1 or 0 as the case may be is applied to alight emitting diode here represented at 50 to produce a light output that is transmitted to the junction of a light responsive diode 52 so that the voltage signal is transmitted to the appropriate output line connected to cable 48C which contains the 72 output lines for the memory. Again, the coupling of the readout signal is independent of voltage level.

The invention is preferably practiced with computer memories of the type described, which are made up of a plurality of essentially identical circuits that can be grouped easily for addressing and, therefore, allow the use of the series connection which cuts down greatly on the amount of current which is applied to the memory. It is, of course, understood that the principles of the invention are not limited to this particular application. Thus, for example, it is immediately apparent to those skilled in the art that memories have already been suggested and some actually constructed using semiconductor elements in which there is direct coupling between positions in the memory in terms of the carrying out of logic and shifting operations in the memory. In such a case, according to the arrangement, electro-optical coupling is provided directly between the boards to transmit signals from board to board which signals are independent of the voltage level on any particular one of the boards. In the same way, logical circuits of the type commonly used in computers can be organized in groups and the groups connected in series across the power supply. It should also be pointed out that the number of groups of circuits which are connected in series should not be extended to the point that overly large voltages are required. Thus, for example, in a memory in which there are more than 72 bits per word or where the voltage requirements per storage circuit are high, the principles of the invention may be applied by dividing the memory into a number of units each containing a group of memory devices. For example, a memory containing 100 bits per word could be divided into four units, each containing 25 groups of storage devices connected in series with each other.

I claim:

1. In a computer including a memory which in turn includes a plurality of storage circuits arranged to store a plurality of multibit words, each of said storage circuits being a circuit of the type in which a substantially constant current flows in one or the other of two different current paths to store binary information and is shifted between the paths to change the value of binary information stored, the improvement comprising:

a. the storage circuits for the same order bit for each word being grouped together so that there are a number of groups of storage circuits equal to the number of bits per word and the number of storage circuits in each group being equal to the number of words in the memory;

b. said groups of storage circuits being connected in series between a pair of voltage supply terminals for the memory, the voltage supply between said terminals being equal to the voltage drop across each group of circuits multiplied by the number of groups, each group of circuits operating at a different voltage level and the current passing through each of said groups connected in series;

c. and means for applying inputs and deriving output signals from said storage circuits in said memory, said means being coupled to said circuits by opto-electronic means which allows signals to be transmitted between said means and each of said groups of circuits independently of the voltage level at which the group is operated.

2. The computer of claim 1 in which each of said groups of storage circuits is arranged on a single circuit plane.

3. The computer of claim 1 in which there is connected in parallel across each said group of storage circuits a shunt regulator.

4. The computer of claim 1 in which the current drawn by each of said groups of storage circuits when information is being stored therein is essentially the same regardless of the information stored and in which when information is being changed therein is less than 10 percent greater than the current required when the information is stored.

5. A computer comprising an integrated circuit memory;

a. said memory comprising a plurality of groups of substantially equal numbers of storage circuits;

b. said groups of storage circuits being connected in series between voltage supply terminals for the memory whereby each group of storage circuits is operated at a different voltage level;

c. and means for applying signals to and receiving signals from said groups of storage circuits which signals are independent of the voltage level at which the particular group is operated.

6. The computer of claim 5 wherein said means for applying signals to and receiving signals from said group of storage circuits comprises optically coupled semiconductor diodes.

7. The computer of claim 5 wherein each group of circuits includes one storage circuit for each word in the memory and only one circuit in each group is addressed for reading or writing at a time.

8. In a computer;

a. a plurality of groups of circuits;

b. voltage supply means;

c. means connecting said groups of circuits in series across said voltage supply means;

d. there being substantially the same number of circuits in each said group and the current required by each group of circuits being essentially the same;

e. and means for applying signals to and receiving signals from said groups of circuits which signals are independent of the voltage level at which the particular group is operated.

9. The computer of claim 8 wherein said circuits are bistable circuits.

10. The computer of claim 8 wherein said means for applying signals to and receiving signals from said group of circuits comprises optically coupled semiconductor diodes.

11. The computer of claim 10 wherein said plurality of groups of bistable circuits form a memory, and the number of bistable circuits in each group equals the number of words in the memory, and the number of groups equals the number of bits per word in the memory.